United States Patent [19]

Muir

[11] Patent Number: 4,952,229

[45] Date of Patent: Aug. 28, 1990

[54] PLANT SUPPLEMENT AND METHOD FOR INCREASING PLANT PRODUCTIVITY AND QUALITY

[75] Inventor: Hugh M. Muir, 2730 Puesta Del Sol, Santa Barbara, Calif. 73105

[73] Assignee: Hugh M. Muir, Hendersonville, N.C.

[21] Appl. No.: 534,990

[22] Filed: Sep. 27, 1983

[51] Int. Cl.$^5$ .......................... C05F 11/08; C05G 3/08
[52] U.S. Cl. ................................................. 71/7; 71/6; 71/23; 71/903; 71/904; 71/DIG. 2; 47/58
[58] Field of Search ................... 435/253; 47/58; 71/6, 71/7, 23, 903, 904

[56] References Cited

U.S. PATENT DOCUMENTS

| | | | |
|---|---|---|---|
| 1,606,015 | 11/1976 | Blackwell | 71/6 |
| 2,767,072 | 10/1956 | Coando | 71/1 |
| 2,828,162 | 3/1958 | Cheronis | 71/1 |
| 2,833,640 | 5/1958 | Bersworth | 71/1 |
| 2,951,755 | 9/1960 | Joffee | 71/11 |
| 3,205,060 | 9/1965 | Lindert | 71/11 |
| 3,224,867 | 12/1965 | Milloch | 71/11 |
| 3,256,083 | 6/1966 | Goring | 71/11 |
| 3,403,992 | 10/1968 | Busch | 71/1 |
| 4,015,970 | 10/1974 | Hennart | 71/11 |
| 4,077,793 | 3/1978 | Krupicka | 71/7 |
| 4,119,429 | 6/1977 | Lovness | 71/6 |
| 4,336,051 | 12/1980 | Marquez | 71/6 |

FOREIGN PATENT DOCUMENTS

| | | | |
|---|---|---|---|
| 0137186 | 10/1980 | Japan | 71/6 |
| 0208191 | 12/1983 | Japan | 71/23 |

OTHER PUBLICATIONS

BIO-CON Company, BIO-CON CRC-400 Series, Product Information Brochure, BIO-CON Company, Bakersfield, Calif., Jan., 1982.
Razee, Don, Beneficial Bacteria Enhance Plant Growth, California Farmer, Nov. 15, 1980.
Suslow, et al., Beneficial Bacteria Enhance Plant Growth, California Agriculture; vol. 33; No. 11-12, Nov./Dec., 1979, pp. 15-17.
Smith, A. M., Microbial Interactions In Soil and Healthy Plant Growth, Australian Plants, vol. 9, pp. 209-212, Dec. 1977.
Baker, Kenneth F., et al., Biological Control of Plant Pathogens, W. H. Freeman & Co., San Francisco, 1974.
Senn, T. L., et al., A Review of Humus and Humic Acids, Horticulture Dept., The South Carolina Agricultural Experiment Station, Clemson University, Research Series No. 145, Mar. 1, 1973.
Russell, Sir John E., The Micro-Organisms of The Soil, Longmons, Green & Co., London, 1923.
Lipman, Jacob G. Bacteria In Relation to Country Life, The Macmillan Company, New York, Fourth Edition, 1912.

*Primary Examiner*—Ferris H. Lander
*Attorney, Agent, or Firm*—Cook, Egan, McFarron & Manzo, Ltd.

[57] ABSTRACT

A soil and foliar supplement for application to plants to improve plant growth and quality. A method for increasing plant productivity and quality also is disclosed. The supplement includes a quantity of specific microbes and an organic acid, such as humic acid, fulvic acid, and ulvic acid. Trace minerals also can be added. A humectant also can be incorporated with the microbes, organic acid, and trace minerals to provide a matrix to provide an improved moisture and nutrient environment and a greatly increased surface area and cation exchange ability for optimizing microbe growth. Chelated micronutrients may also be added to the supplement or added later to the foliage to improve the effects of the supplement still further. Methods of improving plant productivity and quality by treating the plant with the microbes, organic acids and a naturally balanced formulation of chelated minerals are disclosed.

32 Claims, No Drawings

PLANT SUPPLEMENT AND METHOD FOR INCREASING PLANT PRODUCTIVITY AND QUALITY

BACKGROUND OF THE INVENTION

The invention relates to supplements to be applied to soil or plant foliage to increase plant productivity and quality in agricultural, horticultural, forestry and other applications involving living plants. In particular, the invention relates to a supplement to be applied to soil or plant foliage, the supplement containing specific microorganism formulations with organic acids.

An increasingly serious worldwide problem is the depletion of organic matter, or humus, in the soil used for growing plants. This has resulted in some soils having restricted aeration and reduced water-holding capacity. In turn, the number of beneficial microorganisms, i.e., bacteria, actinomycetes and fungi which are primarily responsible for the conversion of macronutrients, micronutrients, and organic materials in the soil into more soluble forms that a plant can utilize, are greatly reduced. The reduction in numbers of microorganisms and organic matter also creates a negative shift in the cation exchange capacity of a soil which results in a further decrease in the nutrient storage capability of the soil which decreases the amount of available nutrients to both the plants and the microorganisms. The microbial and nutrient imbalance places chemical and pathogenic stress on the plants and makes them more susceptible to disease and pests.

The problem is being exacerbated by modern society's increased use of marginally suitable soils for growing plants. These soils are much more sensitive to microbial and chemical imbalances and are depleted at much faster rates.

Initially, growers attempted to solve these problems by increasing the amount of available nutrients in the soil by increasing the amounts of fertilizer and water used on the depleted soils. More and more fungicides and pesticides became necessary to protect the "stressed" plants from disease and pests, thereby further damaging the microflora of the soil. Under these conditions, the use of pesticides and fungicides only accelerated the decrease of the natural microorganisms necessary to healthy plant life.

Of course, microorganisms have been employed in soil treatments as far back as the last century. See, e.g., *Bacteria In Relation To Country Life;* J. Lipman; Macmillan Co.; New York, 1912; and *The Micro-Organisms Of The Soil;* Sir E. John Russell; Longmano, Green & Co.; London, 1923. However, this use consisted for the most part of one or two specific microorganisms or a "grab bag" mixture of soil cultures that were not specifically identified or quantified. Some were nothing more than composted manures carrying groups of microorganisms typically found in such waste. The beneficial activity of such unquantified mixtures on the soil resulted in increased crop yields. More recently, there have been more sophisticated microbial formulations and specific characteristics of individual formulations documented. See, e.g., *Bilogical Control Of Plant Pathogens;* K. Baker, S. Cook, W. H. Freeman & Co.; San Francisco, 1974; *Beneficial Bacteria Enhance Plant Growth;* T. Suslow, J. Kloepper, M. Schroth, T. Burr, U. California Dir. Agri. Su. Reports, California Agriculture; Nov./Dec., 1979; Vol. 33, No. 11 & 12; and *Microbial Interactions In Soils And Healthy Plant Growth;* A. M. Smith, Australian Plants, Vol. 9 (73), pps. 209–212, Dec. 1977.

However, actual use of specific groups of organisms on plants met with varying degrees of success depending on other non-controlled variables. Such variables include (1) the presence or absence of adequate micro and macro nutrients in the soil to support the propagation of the microorganisms; (2) the amount of organic material able to hold nutrients and microbes to create a suitable environment for microbial growth; and (3) the presence or absence of certain minerals required by the plant for proper uptake of the nutrients provided by the microbial acitivity.

The object of the present invention is to provide an improved supplement to soil or foliage, providing a complete balanced microbial, nutrient and physical/chemical environment for increasing plant productivity and quality.

Another object of the present invention is to provide an improved method for increasing specific microbial activity and levels in soil or foliage and for increasing the beneficial effects of that activity to plants' productivity and quality.

Other and further objects of the present invention will become apparent from the following descriptions of its embodiment.

SUMMARY OF THE INVENTION

The present invention contemplates a supple;:ent for application to soil or foliage and a method to improve plant productivity and quality. The supplement includes a quantity of microbes or microorganisms with humic, fulvic and ulvic acid. Trace minerals required by the plant, but which may be lacking or out of balance in the natural soil, may also be added as well as a humectant and chelated micronutrients. The microorganisms, i.e. bacteria, fungi and actinomycetes, are capable of a broad range of beneficial activities. The number and types of microorganisms may be varied to meet individual soil conditions.

The humic, fulvic, and ulvic acids are organic acids which have the ability to stimulate native soil microorganisms and thus significantly raise organic content levels. The organic acids contribute to increasing availability of the less readily available minerals to the plants' root system. The chelated trace minerals add to this contribution.

A humectant may be used in combination with the microbes, organic acid and trace minerals to provide a matrix for improved moisture, oxygen transfer and nutrient and cation exchange environment for microbe propagation. The humectant also cause release of the nutrients, organic acids and microorganisms' by-products slowly over a long period of time, thereby increasing the effectiveness of the supplement. As a result of this slow, prolonged release, fertilizer and water requirements of the soil will be significantly reduced.

Chelated micronutrients also may be added to the supplement for direct use by the plant. The combined use of specific microorganisms, the liquid organic acid, trace minerals, and the humectant with these micronutrients improves the solubility and long term availability of the micronutrients across the leaf surface.

The method for increasing plant productivity and improving plant quality relies on application of the above-described ingredients on soil or foliage. The microorganisms and organic acids are applied to the soil directly, usually through an irrigation system or to plant foliage through foliar sprays. The trace minerals and humectant also may be applied directly to the soil or the foliage. The micronutrients are preferably applied to the foliage, but, of course, also may be applied with the other ingredients to the soil.

Use of the presently described invention allows for equal or better results from application of less quantities of the individual components applied along. Consequently, the overall cost of using the supplement is less than the greater quantities of the individual components necessary to obtain similar or worse results. Further, in marginal soils, the combination of the components produces much greater results unobtainable with any quantity of the individual components.

Specific types of plants or growing conditions require a fine-tuning acquired through leaf and petiole analysis to obtain optimal results from this supplement. Tree crops, vegetable crops, vine and berry crops, field and row crops, and crops grown in hydroponics, such as cucumber or tomato plants, require differing treatments to accomplish maximum effectiveness. Frost freeze protection also can be obtained by application of the supplement.

DETAILED DESCRIPTION OF THE PREFERRED EMBODIMENT

The supplement includes microorganisms and one or more organic acids which when present in the soil or foliage together coact to become more effective than when present individually. Chelated trace minerals, a humectant and chelated micronutrients may be added to improve the effectiveness of the supplement. Preferably, the supplement includes microorganisms and the organic acid(s). Alternatively, trace minerals, a humectant and micronutrients also may be included.

The microorganisms, i.e. bacteria, fungi and actinomycetes, are selected for their specific activities, such as nitrogen fixation, nitrogen stabilization, cellulosic digestion, lipid digestion, protein digestion, and starch and carbohydrate conversion to plant and microorganism nutrients. These same bacteria, fungi and actinomycetes contribute significantly through their metabolism and various enzyme by-products to increasing the availability of nutrients to a plant. Typically, a well-composited manure utilized as a soil amendment will contribute an increase of $10^2$ or $10^3$ microbes per gram of soil. However, the present formulation will raise and maintain a soil's microbial level by $10^6$ to $10^9$ microbes per gram of dry soil. The use of certain microorganisms at these higher microbial count levels greatly improves the plant performance and, at the same time, provides much more positive pathogen suppression. These microbes are produced by well known standard microbial fermentation techniques.

The preferred embodiment of the invention includes fourteen species of microbes in the following numbers per gram of the microbes in an inert carrier. The inert carrier is preferably a diatomaceous earth but, alternatively is any inert or non-inert carrier or filter-aid known in the art. The following list identifies the preferred fourteen species and relative numbers per gram of carrier.

-continued

| Microbe | Concentration: Number/Gram Carrier |
|---|---|
| Bacillus thuringiensis | 1.00 billion/gm. |
| Bacillus subtillis | 1.00 billion/gm. |
| Arthrobacter globiformis | 0.50 billion/gm. |
| Arthrobacter agilis | 0.50 billion/gm. |
| Nocardia opaca | 0.50 billion/gm. |
| Nocardia corallina | 0.50 billion/gm. |
| Pseudomonas denitrificans | 1.00 billion/gm. |
| Pseudomonas fluorescens | 0.50 billion/gm. |
| Pacteroides succinogenes | 1.75 billion/gm. |
| Bacteroides lipolyticum | 1.75 billion/gm. |
| Kurthia zopfil | 0.1 billion/gm. |
| Brevibacterium lipolyticum | 0.1 billion/gm. |
| Aspergillus terreus | 0.1 billion/gm. |
| Rhizopus arrhizus | 0.1 billion/gm. |

This formulation is presently commercially available from Material Science Company of Santa Barbara, California, under the trade name Bio-Con CRC-400.

Additional microbes can be added to or substituted for the above-listen microorganisms. Such microbes include the following:

| Microbe | Concentration: Number/ Gram Carrier |
|---|---|
| Arthrobacter Citreus | 0.5 billion/gm. |
| Arthrobacter Luteus | 0.5 billion/gm. |
| Arthrobacter simplex | 0.5 billion/gm. |
| Bacillus brenis | 0.5 billion/gm. |
| Bacillus macerans | 0.5 billion/gm. |
| Bacillus pumilus | 0.2 billion/gm. |
| Bacillus polymyxa | 0.2 billion/gm. |
| Pseudomonas putida | 0.5 billion/gm. |
| Streptomycus cellulasae | 0.1 billion/gm. |
| Streptomycus fradiae | 0.1 billion/gm. |
| Streptomucus griseoflavus | 0.1 billion/gm. |
| Acinetobacter lwoffii | 0.5 billion/gm. |

Further microorganisms can be added to meet specific soil conditions. For example, additional nitrogen fixation through biological fixation of atmospheric nitrogen is accomplished by addition of:

| Microbe | Concentration: Number/ Gram Carrier |
|---|---|
| Azotobacter chroococcum | 0.20 billion/gm. |
| Azotobacter paspali | 0.20 billion/gm. |

Additional microbes that accomplish nitrogen fixation may be added or substituted for those listed above. Such additional microbes include:

| Microbe | Concentration: Number/ Gram Carrier |
|---|---|
| Azosprillum brasilenese | 0.2 billion/gm. |
| Azosprillum lipoferum | 0.2 billion/gm. |

This product is commercially sold as Bio-Con CRC-400N by BC Industries, Inc.

Three fungal cultures can be added to the microbial segment of the supplement to accomplish increased cellulose digestion and lignin enzyme production. This is especially useful in areas where a high percentage of plant residue is present in the soil. These fungi help to rapidly break down such plant material and liberate food and energy for plant use. These fungi are presumably used in the following concentrations in addition to the standard fourteen microbes.

| Fungus | Concentration: Number/ Gram Carrier |
|---|---|
| Myrothecium verrucaria | 0.20 billion/gm. |
| Trichoderma viride | 0.20 billion/gm. |
| Phanerochaete chrysosporium | 0.10 billion/gm. |

Still other microorganisms can be added to the basic fourteen species for use in a hydroponic environment. These microbes would be added to the original fourteen microbes with somewhat "shifted" concentrations. These additional microbes are:

*Pseudomonas halestorga*
*Pseudomonas calcis*
*Pseudomonas gelatica*
*Pseudomonas marinoglutionosa*
*Pseudomonas nigriaciens*
*Brevibacterium stationis*

These highly complex microorganism formulations establish themselves very rapidly in the soil. The selection of the special multi-components included in these microbial mixtures are such that a potent, compatible, and highly active bioculture results that is capable of bringing about accelerated growth rates and increased yields in selected crops. Various native and supplemental rhizoshere microorganisms also affect the growth of plants by the formation of biologically active substances in the region of plant roots. The multiple chemical reactions that are initiated in the soil are extremely complex. This complexity ensures the beneficial reactions being maintained for sufficient periods of time to produce the desired acceleration in growth rates in a very wide variety of soils and growth environments through the combined use of these described combinations of the supplemental materials.

The organic acid, chelated trace mineral component of the supplement is a natural chelated liquid extraction from fossilized leonardite deposits. The deposits were formed by the decomposition of plant and animal residues by aerobic and anaerobic microorganisms. Chemically, these materials consist of varying amounts of humic, fulvic, ulvic acids and trace elements or minerals. This component has been found to contain a mixture of humic acid, fulvic acid and ulvic acid in range of about three percent (3%) to twenty percent (20%) plus naturally chelated minerals (except Fe, Zn and Mn which are chelated with EDTA). The minerals in these deposits listed below are found in varying percentages. Preferably, these are naturally occuring blends of these minerals. The invention contemplates, however, that one or more of these minerals adds significantly to the effectiveness of the supplement.

Element

Calcium
Magnesium
Phosphorus
Potassium
Iron
Manganese
Zinc
Cadmium
Copper
Aluminum
Silicon
Molybdenum
Boron
Sodium
Cobalt
Sulfur
Barium
Titanium This formulation has been employed alone to constitute beneficial humic acid and trace minerals to a soil for improving crop growth rate and productivity. Such a product is commercially available from Material Science Co. of Santa Barbara, Calif. under the trade name Huma-Blend B. Stimulation of native soil microorganisms does occur using these products. The natural chelating effect inherent in these products contributes to an increased availability of the less readily available minerals to a root system. It supplies a source of naturally balanced trace minerals or micronutrients necessary for healthy plant growth. Improved soil aeration and permeability are two further physical benefits obtained.

The minerals contemplated to be utilized in the supplement are vital to the functioning of a plant. The chelated characteristic of the minerals increases plant efficiency of mineral uptake by plants. While soils may contain some or even all of the minerals included in the supplement, availability of quantities of these minerals in the proper relative amounts acts to increase plant vitality. The chelated minerals included in the supplement guarantee that the soil contains sufficient amount and proper balance of the minerals.

A humectant can be included in the supplement to improve performance. The humectant is a potassium salt derivative of starch-polyacrylate graft polymers which can be derived from corn starch. There are several synthetic humectant products available, but they do not have all of the beneficial effects of the "natural" humectant products when employed with the microorganisms. Therefore, the preferred embodiment of the invention utilizes "natural" humectant.

The humectant, whether used in a soil form or in foliar form, has high water and nutrient absorption and retention characteristics. It also has a high surface area and excellent oxygen transfer qualities. It further contributes to the cation exchange efficiency of a soil. These parameters make it an excellent microbial matrix into which are inserted the microbial organic acid and trace minerals for application to soil or foliage. Further, the chelating effects of the trace minerals are enhanced and the plants are protected from ultrviolet light when the humectant is applied to foliage. The humectant also can be used in a diluted form as a carrier for the microorganisms, acid and trace minerals in a foliar spray and is a highly efficient, rapid nutritional transporter of nutrition to a plant through the leaf structure.

The acids and trace minerals combined in the supplement with the microorganisms listed above and a humectant create an optimum natural organic humus possessing all of the required microbial, physical and chemical parameters required to bring about a highly productive soil, even in a very marginal soil environment. The humectant has an extremely high surface area having a most efficient oxygen transfer ability and varying degrees of water retention up to 1,000 times its weight. This provides the microbial constituents of the formulation with a matrix that allows for far greater propagation than would occur even in a soil possessing high organic levels. The ability of this humectant portion of the formulation not only to hold large amounts of water and nutrients but to establish a "slow release" effect ensures long-term high propagation of the microbial components of both the inoculated formulations, as well as native microflora. It has been determined that at least a fifty percent (50%) increase in microbial performance is obtained utilizing this humectant feature in both soil and foliar formulations.

Although the trace minerals included with the organic acids provide an excellent natural trace mineral cross-section, there are specific environmental conditions that require additional micronutrient additives. This can be very efficiently managed through the foliar application of specific, chelated trace minerals as needed, based upon leaf or petiole analysis. The enhanced levels of these specific micronutrients can contribute to increased crop productivity and improved quality, as well as reduced susceptibility to plant disease and pest investation.

A further component of micronutrients can be included in the supplement to accomplish improved foliar feeding. It has been determined that the combined use of specific microorganisms and the liquid organic acid/trace minerals in a liquid suspension containing the humectant product improves the solubility and availability of these micronutrients through a leaf surface. The humectant portion of the formulation also ensures long term microbial activity on a leaf surface by maintaining a high moisture matrix on the leaf surface. As in the soil, the matrix provides the ideal moisture and nutrient environment for optimizing the microbes' performance. An overall reduction in both the required amount of micro/macronutrients and the frequency of application is consequently obtained with the supplement. The micronutrients of this invention may be any micronutrients known in the art.

The amount of micro and macronutrients employed in the supplement can vary depending on the need, based on leaf or petiole analysis. Preferably, a range of about 5–50 parts per million is used. Alternatively, any amount will be beneficial.

The combination of microbes and micronutrients ultimately produces enzymes including Lipase, Cellulase, Anylase, Proteases, Cytase and others. The invention contemplates that inferior results may be obtained by subsituting certain enzymes for the microbes, combining the enzymes with the humic/fulvic/ulvic acid. This alternative is, however, considered within the scope of the invention. Further alternatives may include the humectant and trace minerals with the enzymes.

Synergistic benefits are gained from adding together the components of this supplement. When specific amounts of humic, fulvic and ulvic acids combined with trace minerals (chelated) are included along with the microbial inoculation, an increase in the plant/crop productivity is noted which amounts to some twenty-five percent (25%) further improvement in plant/crop performance. Typically, crop yields for vegetables, vine and berry crops have been observed to increase in the twenty-five percent (25%) to fifty percent (50%) range. The economics of this type of soil supplement are further improved by the fact that the overall quality of the fruit is also greatly enhanced. This takes the form of improved storage quality, less crop fragility, better flavor, significantly improved flavor, frost and drought resistant, and perhaps most important, improved nutritional quality. All of these benefits are usually accomplished with reductions of fertilizers in the twenty-five percent (25%) to fifty percent (50%) range for most crops The invention preferably includes the specific microbes and humic, fulvic and/or ulvic acids with trace minerals to produce the unexpected result that a great reduction of the individual components is necessary to accomplish the combination of individual results. The table below indicates the positive results obtained through use of the specific microbes alone, and with organic acids along as compared with the results obtained from the combination, with a dramatic decrease in amounts of individual components used.

|  | Amount (Acre Per Crop Cycle) | Nitrogen Reduction (Percentage Decrease of Needed Fertilizer) | Growth Rate Response (Increase Over Control) | Crop Yield Increases (Over Control) |
| --- | --- | --- | --- | --- |
| Generally |  |  |  |  |
| Microbes | 180–240 grams | 15–25% | 10–20% | 10–25% |
| Humic/Fulvic/Ulvic Acid (Plus trace minerals) | 64–128 grams | 15–25% | 10–20% | 10–25% |
| Microbes and Humic/Fulvic/Ulvic Acid (Plus trace minerals) | Microbes 60–120 grams Acid: 24–64 grams | 25–50% | 25–40% | 25–75% |
| Field Crops |  |  |  |  |
| Microbes | 180–240 grams |  |  | 25–35% |
| Humic/Fulvic/Ulvic Acid (Plus trace minerals) | 64–128 grams |  |  | 15–20% |
| Microbes and Humic/Fulvic/Ulvic Acid (Plus trace minerals) | Microbes 60–120 grams Acid: 32–64 grams |  |  | 45–50% |
| Orchard Crops |  |  |  |  |
| Microbes | 180–240 grams |  |  | 35–55% |
| Humic/Fulvic/Ulvic Acid (Plus trace minerals) | 64–128 grams |  |  | 20–25% |
| Microbes and | Microbes |  |  | 65–100% |

| | Amount (Acre Per Crop Cycle) | Nitrogen Reduction (Percentage Decrease of Needed Fertilizer) | Growth Rate Response (Increase Over Control) | Crop Yield Increases (Over Control) |
|---|---|---|---|---|
| Humic/Fulvic/ Ulvic Acid (Plus trace minerals) | 60–120 grams Acid: 32–64 grams | | | |

Inclusion of the humectant to the specific microbes and organic acids reduces the amount of necessary components (microbes and acid) by an additional 5–15%. This result is independent of the quality of the soil being treated.

Further, the supplement has advantageous buffering characteristics in both acidic and alkaline soils. For example, soils in the 8.0–8.5 pH range are reduced to 7.0–7.3 pH range, while soils in the 5.0–5.5 pH range are raised to 6.2–6.8 pH range during one (1) year of use as directed below.

The method of increasing productivity and improving the quality of plants utilizes applying the supplement to the plants.

The microorganisms and humic/fulvic/ulvic acid are applied to the plants through the soil by application to the soil, by irrigation, or to the foliage by foliar spray dusting, or, in the use of hydroponics, to the foliage or ambient water.

The humectant also may be applied with the microorganisms and acid by foliar spray, by incorporation into irrigation water, or by dusting.

The micronutrients are specifically used for foliar feeding and are applied with the various other components only as a foliar spray.

Extensive research has revealed specific applications of the supplement and the method disclosed above. Five examples of applications follow. These examples have been found to produce optimum results for the specific applications described in the great majority of soil conditions. The invention contemplates that minor variations of the stated quantities and applications may be used in response to measurable soil and plant characteristics. The invention further contemplates application in per acre per crop rates which includes single applications once during a cycle of the entire amount or many applications during a cycle of lesser amounts.

EXAMPLE I

Tree Crops (including avocado plants)

1. Transplanting Nursery Stock.
    (a) Use as a soil treatment:

| Component | Amount per Acre Per Crop Cycle |
|---|---|
| Humectant | 1–2 oz. per tree |
| Microorganisms | (5–10 g.) – per 378 l. |
| Humic acid/trace minerals | (60–120 ml.) or 100 gal. |

Procedure: Disperse the soil humectant evenly in the backfill soil. Replace treated soil below and around root bundle. Water in with approximately 1 gal. or 4 l. of the microorganisms and humic acid/trace mineral mixture.
    (b) Use for maintenance:

| Component | Amount per Acre Per Crop Cycle |
|---|---|
| Microorganisms | 30 g. (1 oz.) |
| Humic acid/trace minerals | 180–360 ml. (6–12 oz.) |

2. Use on Trees (2–4 years old).

| Component | Amount per Acre Per Crop Cycle |
|---|---|
| Microorganisms | 60 g. (2 oz.) |
| Humic acid/trace minerals | 360–720 ml. (12–24 oz.) |

3. Use On Mature Trees

| Component | Amount per Acre Per Crop Cycle |
|---|---|
| Microorganisms | 60–120 g. (2–4 oz.) |
| Humic acid/trace minerals | 1 to 1-½ l. (32–48 oz.) |

The maintenance dosage rate is best applied on a multiple addition basis of 6–12 times per year in available irrigation system.

4. Foliar Spray (based upon 100 l. (25 gal.) solution).

| Component | Amount per Acre per Crop Cycle |
|---|---|
| Microorganisms | 5–10 g. |
| Humic acid/trace minerals | 120–240 ml. (4–8 oz.) |
| Humectant | 50–100 g. |
| Micronutrients | As required by leaf analysis |

Foliar spray is employed 1–2 times a year on avocado trees.

EXAMPLE II

Vegetable Crops (Bell Peppers)

1. Use For Soil Innoculation.

| Component | Amount per Acre per Crop Cycle |
|---|---|
| Microorganisms | 60–120 g. (2–4 oz.) |
| Humic acid/trace minerals | 1–2 l. |
| Micronutrients | As required by leaf analysis. |

Dosage rates: ½ the prescribed dosage rate just prior to or just after planting. Remainder of product added 2–3 weeks after first application.

2. Use As A Foliar Spray Formulation (based on 378 l. or 104 gal.

| Component | Amount per Acre per Crop Cycle |
|---|---|
| Microorganisms | 5–10 g. |
| Humic acid/trace minerals | 120–240 ml. (4–8 oz.) |
| Humectant | 50–100 g. |
| Micronutrients | As required by leaf analysis. |

EXAMPLE III

Vine and Berry Crops (Strawberry)

1. Use for Soil Inoculation.

| Component | Amount per Acre Per Crop Cycle |
|---|---|
| Microorganisms | 60–120 g. |
| Humic acid/trace minerals | 1–2 l. |

Procedure: ½ the prescribed dosage is inoculated into the soil. The remainder of the materials are added in 3–6 weeks after initial application in available irrigation system.

2. Use For Foliar Spray Application.

| Component | Amount per Acre Per Crop Cycle |
|---|---|
| Microorganisms | 15–30 g. |
| Humic acid/trace minerals | 120–240 ml. (4–8 oz.) |
| Micronutrients | 1–2 times over crop growth cycle. |

Soil humectant dosage rates will be based upon the physical properties of the soil in question. Dosage rates will range from 25–75 pounds per acre. The soil humectant can be applied dry, employing a seed spreader, followed by discing, or it may be applied in a gel form with drilling equipment. The product should be set at 6–8 inches deep in the soil.

EXAMPLE IV

Field and Row Crops (Rye Grass)

1. Use For Soil inoculation

| Component | Amount per Acre per Crop Cycle |
|---|---|
| Microorganisms | 30–45 g. |
| Humic acid/trace minerals | 120–180 ml. (4–6 oz.) |

The microorganisms and humic acid may be blended together and then injected or entered into any available irrigation system. A single application is employed for this type of application.

2. Use For Foliar Spray Formulation.

| Component | Amount per Acre per Crop Cycle |
|---|---|
| Microorganisms | 5–10 g. |
| Humic acid/trace minerals | 90–120 ml. (3–4 oz.) |
| Humectant | 50–100 g. |
| Micronutrients | Water each cut. |

EXAMPLE V

Hydroponics (Cucumber/Tomato)

1. Use For Initial Media Inoculation.

| Component | Amounts per $264^3$ or 1,000 gal. |
|---|---|
| Microorganisms | 5–10 g. |
| Humic acid/trace minerals | 90–120 ml. (3–4 oz.) |
| Humectant | 250–500 g. (½–1#) |

2. Use For Crop Maintenance (additions to total water).

| Component | Amounts per $264^3$ or 1,000 gal. |
|---|---|
| Microorganisms | 2–5 g. |
| Humic acid/trace minerals | 50–75 ml. |

3. The foliar spray formulation is applied as required by leaf analysis.

A further surprising and unexpected result of application of the described invention is increased plant resistance to frost damage. Foliage and crops can withstand temperatures 4°–6° F. lower and for much greater exposure time at these temperatures than untreated plants and crops. Frost/freeze burn and product drop is very noticeably decreased. This is due to several reasons:

(1.) A marked increase (50 to 100%) in the surface area and root bundle mass. This creates a very effective insulation barrier and effectively maintains the plants' vigor during low temperature periods.

(2.) The greatly improved chemical and mineral balance in the plant and fruit provide an "antifreeze" protection of sorts. Higher glycol protein and carbohydrate levels along with the elevated trace mineral content are perhaps the major chemical reasons for the thermal protection evident.

(3.) The greatly increased numbers of beneficial bacteria, fungi, and actinomycetes in the soil, $10^6$ to $10^9$ counts/dry gram soil, will raise the temperature in the rhizosphere. This coupled with the greater root mass insulation barrier slows the rate of temperature drop in the surrounding soil.

It has also been observed that the use of foliar sprays consisting also of specific microbial formulations, humic and fulvic acids, and humectants does also provide significant frost/freeze protection to the foliage and crops. This protection is mainly due to the fact that a tenacious thin film of moisture containing high numbers of highly active beneficial microbes provides microbial nucleation sites that effectively allows ice crystals to form. These ice crystals provide a thermal protective barrier against temperatures lower than the freezing point of water.

The use of the humectant in these formulations allows a long term thin film application to be made to a crop. Spraying can be made days before an expected frost and still provide excellent thermal stability to both the foliage and crop and at the same time be establishing improved internal organic and inorganic chemical balance to the crop.

Those who are skilled in the art will appreciate that various modifications can be made to the embodiments described herein without departing from the spirit of the present invention. Accordingly, it is intended that the foregoing description be taken in an illustrative sense, and that the scope of protection be defined by the appended claims.

What is claimed is:

1. A soil and foliage supplement to improve crop growth and quality comprising:
   a plurality of microbes species for fixing and stabilizing nitrogen, for digesting cellulosic matter, lipids and protein, and for converting starch and carbohydrates to plant and microorganism nutrients; and
   an organic acid selected from the group consisting of humic acid, fulvic acid, ulvic acid and mixtures thereof.

2. The supplement of claim 1 further comprising: a trace mineral.

3. The supplement of claim 1 further comprising:
   at least two trace minerals selected from the group consisting of calcium, magnesium, potassium, phosphorus, iron, manganese, zinc, cadmium, copper, aluminum, silicon, barium, titanium, molybdenum, boron, sodium, sulphur, cobalt and mixtures thereof.

4. The supplement of claims 1 or 3 wherein the plurality of microbe species are selected from the group consisting
   *Bacillus thuringiensis*
   *Bacillus subtillis*
   *Arthrobacter globiformis*
   *Arthrobacter agilis*
   *Nocardia coarallina*
   *Pseudomonas denitrificans*
   *Pseudomonas fluorescens*
   *Bacteroides succinogenes*
   *Bacteroides lipolyticum*
   *Kurthis zopfil*
   *Brevibacterium lipolyticum*
   *Aspergillus terreus*
   *Rhizopus arrhizus*
   *Pseudomonas fluorescens*
   *Azotobacter chroococcum*
   *Azotobacter paspali*
   *Myrothecium verrucaria*
   *Trichoderma viride*
   *Phanerochaete chrysosporium*
   *Pseudomonas halestorga*
   *Pseudomonas calcis*
   *Pseudomonas gelatic*
   *Pseudomonas marinoglutionosa*
   *Pseudomonas nigriaciens*
   *Brevibacterium stationis*
   *Arthrobacter citreus*
   *Arthrobacter luteus*
   *Arthrobacter simplex*
   *Azosprillum brasilienese*
   *Azosprillum lipoferum*
   *Bacillus brenis*
   *Bacillus macerans*
   *Bacillus pumilus*
   *Bacillus polymyxa*
   *Pseudomonas putida*
   *Streptomycus cellulasae*
   *Streptomycus fradiae*
   *Streptomucus griseoflavus*
   *Acinetobacter lwoffii*
   and mixtures thereof.

5. The supplement of claims 1 or 3 wherein the plurality of microbe species include:
   *Bactillus thuringiensis*
   *Bacillus subtillis*
   *Arthrobacter globiformis*
   *Arthrobacter agilis*
   *Nocardia opaca*
   *Nocardia corallina*
   *Pseudomonas denitrificans*
   *Pseudomonas fluorescens*
   *Bacteroides succinogenes*
   *Bacteroides lipolyticum*
   *Kurthia zopfil*
   *Barevibacterium lipolyticum*
   *Aspergillus terreus*, and
   *Rhizopus arrhizus*.

6. The supplement of claim 5 wherein the plurality of microbe species further includes species selected from the group consisting of *Azotobacter chroococcum, Azotobaxter paspali, Azosprillum brasilenese, Azosprillum lipoferum*, and mixtures thereof, whereby additional nitrogen fixation is accomplished.

7. The supplement of claim 5 wherein the plurality of microbe species further includes species selected from the group consisting of *Myrothecium verrucaria, Trichoderma viride, Phanerochaete chrysosporium* and mixtures thereof, whereby the plurality of microbe species has increased cellulosic digestion and lignin enzyme production capability.

8. The supplement of claim 5 wherein the plurality of microbe species further includes *Pseudomonas halestorga, Pseudomonas calcis, Pseudomonas gelatic, Pseudomonas marinoglutionosa, Pseudomonas nigriaciens*, and *Brevibacterium stationis*, whereby the plurality of microbe species has improved performance in a hydropenic environment.

9. The supplement of claims 1 or 3 wherein the plurality of microbe species comprises by numbers of microbes:
   about ten percent (10%) *Bacillus thuringiensis;*
   about ten percent (10%) *Bacillus subtillis;*
   about five percent (5%) *Arthrobacter globiformis;*
   about five percent (5%) *Arthrobacter agilis;*
   about five percent (5%) *Nocardia opaca;*
   above five percent (5%) *Nocardia coarallina;*
   ten percent (10%) *Pseudomonas denitrificans;*
   about five percent (5%) *Pseudomonas fluoroescens;*
   about eighteen percent (18%) *Bacteroides succinogenes;* and
   about eighteen percent (18%) *Baxteroides lipolyticum*.

10. The supplement of claim 9 wherein the plurality of microbe species further comprises by number of microbes:
    about one percent (1%) *Kurthia zopfil;*
    about one percent (1%) *Brevibacterium liopolyticum;*
    about one percent (1%) *Aspergillus terreus;* and
    about one percent (1%) *Rhizopus arrhizus*.

11. The supplement of claim 2 further comprising:
    a humectant for providing the plurality of microbe species with a matrix to enhance propagation.

12. The supplement of claim 11 wherein the humectant is a potassium salt of a starch/polyacrylate graft polymer.

13. The supplement of claims 2 or 11 further comprising:
a chelated micronutrient to further encourage microbe propagation.

14. A method for improving the growth of crops comprising treating the soil with a plurality of microbe species on a carrier and an organic acid combined with at least one trace mineral, the organic acid selected from the group consisting of humic acid, fulvic acid, ulvic acid, and mixtures thereof.

15. A method for improving the growth of crops comprising applying to the foliage a plurality of microbe species on a carrier and an organic acid combined with at least one trace mineral, the organic acid selected from the group consisting of humic acid, fulvic acid, ulvic acid and mixtures thereof.

16. A method for improving the growth of nursery stock comprising treating the soil, per acre per crop cycle, with about 5 to 10 grams of a plurality of the microbe species on a carrier and about 60 to 120 milliliters of organic acid selected from the group consisting of humic acid, fulvic acid, ulvic acid, and mixtures thereof.

17. The method of claim 16 further comprising treating the soil with about 1 to 2 ounces of humectant per tree per crop cycle.

18. The method of claim 17 wherein at least one trace mineral is included with the organic acid, wherein the microbes and organic acids are dispersed in 100 gallons of water, wherein the humectant is dispersed evenly in the backfill soil, wherein root bundle soil is replaced with treated soil and wherein the plant is watered with one gallon of the water containing the microbes, organic acid and trace minerals.

19. A method for maintaining transplanted nursery stock comprising treating the soil, per acre per crop cycle, with about 30 grams of a plurality of microbe species on a carrier and about 180 to 360 milliliters of an organic acid selected from the group consisting of humic acid, fulvic acid, ulvic acid, and mixtures thereof, combined with at least one trace mineral.

20. A method for improving the growth of tree crops which are about 2 to 4 years old comprising treating the soil, per acre per crop cycle, with about 60 grams of a plurality of microbe species on a carrier and about 360 to 720 milliliters of an organic acid selected from the group consisting of humic acid, fulvic acid, ulvic acid and mixtures thereof, combined with at least one trace mineral.

21. A method for improving the growth of mature tree crops comprising treating the soil, per acre per crop cycle, with about 60 to 120 grams of a plurality of microbe species on a carrier and about 1 to 1.5 liters of an organic acid selected from the group consisting of humic acid, fulvic acid, ulvic acid and mixtures thereof, combined with at least one trace mineral.

22. A method for improving the growth of tree crops comprising applying to the foliage of the crop, per acre per crop cycle, about 5 to 10 grams of a plurality of microbes on a carrier, about 120 to 240 milliliters of an organic acid selected from the group consisting of humic acid, fulvic acid, ulvic acid and mixtures thereof, the acid combined with at least one trace mineral, and about 50 to 100 grams of a humectant.

23. The method of claim 14 wherein the soil of vegetable crops is inoculated with, per acre per crop cycle, about 60 to 120 grams of the microbe species on a carrier and about 1 to 2 liters of the organic acid.

24. The method of claim 15 wherein the foliage of vegetable crops has applied, per acre per crop cycle, about 5 to 10 grams of the microbe species, on a carrier, about 120 to 240 milliliters of the organic acid and further comprising treating with about 50 to 100 grams of a humectant.

25. The method of claim 14 wherein the soil of vine and berry crops is inoculated, per acre per crop cycle, with about 60 to 120 grams of the microbe species, on a carrier and about 1 to 2 of the organic acid.

26. The method of claim 15 wherein the foliage of vine and berry crops has applied to it, per acre per crop cycle, about 15 to 30 grams of the microbe species on a carrier and about 120 to 240 milliliters of the organic acid.

27. The method of claim 14 wherein the soil of field and row crops are inoculated, per acre per crop cycle, with about 30 to 45 grams of the microbe species on a carrier and about 120 to 180 milliliters of the organic acid.

28. The method of claim 15 wherein the foliage of field and row crops has applied to it, per acre per crop cycle, about 5 to 10 grams of the microbe species on a carrier and about 90 to 120 milliliters of the organic acid, and further treating the foliage, per acre per crop cycle, with about 50 to 100 grams of a humectant and with micronutrients.

29. The method of claim 14 wherein the media of a hydroponic tank is initially inoculated, per 1,000 gallons, with about 5 to 10 grams of the microbe species on a carrier and about 90–120 milliliters of the organic acid, and further the media being inoculated with about 250 to 500 grams of a humectant.

30. The method of claim 14 wherein the media of a hydroponic tank is inoculated per 1,000 gallons, with about 2 to 5 grams of the microbes on the carrier and about 50 to 75 milliters of the organic acid.

31. A method of improving frost/freeze protection to plants comprising spraying onto at least a portion of the plant, the mixture comprising:
a plurality of microbe species for fixing and stabilizing nitrogen, for digesting cellulosic matter, lipids and protein, and fox converting starch and carbohydrates to plant and microorganism nutrients; and
an organic acid selected from the group consisting of humic acid, fulvic acid, ulvic acid and mixtures thereof.

32. The method of claim 31 wherein an humectant is added to the mixture for spraying onto the plant portions to provide and enhance thermal stability thereto.

* * * * *

UNITED STATES PATENT AND TRADEMARK OFFICE
CERTIFICATE OF CORRECTION

PATENT NO. : 4,952,229

DATED : August 28, 1990

INVENTOR(S) : Hugh M. Muir

It is certified that error appears in the above-identified patent and that said Letters Patent is hereby corrected as shown below:

On the title page, Item [75] should read as follows:

[75] Hugh M. Muir, 210 Tranquility Place, Hendersonville, North Carolina 28739

Signed and Sealed this

Eleventh Day of February, 1992

Attest:

HARRY F. MANBECK, JR.

Attesting Officer

Commissioner of Patents and Trademarks